United States Patent [19]
Kahr

[11] 3,888,061

[45] June 10, 1975

[54] COMPONENT PART OF LAMINATED BOARD AND A PROCESS FOR MANUFACTURING SUCH COMPONENT PART

[76] Inventor: Olof Kahr, Transtorpsvägen 237, 382 00 Nybro, Sweden

[22] Filed: May 24, 1973

[21] Appl. No.: 363,497

[52] U.S. Cl. .................. 52/589; 52/309; 156/182; 52/313; 52/593; 428/45; 428/57; 428/83; 428/106
[51] Int. Cl............................................ B32b 3/10
[58] Field of Search ............ 161/36, 37, 38, 55, 56, 161/60; 52/309; 156/182

[56] References Cited
UNITED STATES PATENTS

| | | | |
|---|---|---|---|
| 1,523,105 | 1/1925 | Doe | 161/60 X |
| 2,653,358 | 9/1953 | MacDonald | 161/38 X |
| 3,365,850 | 1/1968 | Marino | 161/36 X |
| 3,730,797 | 5/1973 | Jensen | 161/60 |

FOREIGN PATENTS OR APPLICATIONS

| | | | |
|---|---|---|---|
| 558,469 | 6/1958 | Canada | 161/56 |
| 57,275 | 11/1920 | Sweden | |

OTHER PUBLICATIONS

Menetrey, German Application 1,453,351, printed April 30, 1970, (38K, 2/01), 21 pages spec., 2 sheets drawing.

*Primary Examiner*—William E. Schulz
*Attorney, Agent, or Firm*—Robert E. Burns; Emmanuel J. Lobato; Bruce L. Adams

[57] ABSTRACT

Floor boarding is supported on a laminated core which comprises oblong panels of wood boards. The boards extend longitudinally and transversely, in re-current patterns. The core is strengthened notably where the boards of the panels extend transversely. The strengthening is provided by edge fillets extending longitudinally. Step-like joints are provided for this purpose, between the laminated edge fillets and boards. One of each part of laminated fillets is made of hard-wood.

13 Claims, 8 Drawing Figures

COMPONENT PART OF LAMINATED BOARD AND A PROCESS FOR MANUFACTURING SUCH COMPONENT PART

The present invention refers to a component part of laminated board and a process for manufacturing such component part.

In consideration of recent demands on the market there is a trend towards very thin laminated board constructions such as for parquet flooring. To illustrate this demand for extremely thin laminated boards it is assumed that a portion of an apartment, such as a single room, is to be fitted with a full-cover carpet and an adjacent room with parquet flooring, there being provided a sill for free transition between the two floor coverings which means that the difference in level should be practically negligeable. Moreover, problems may be encountered regarding the least permissible headroom in the room in question when a parquet flooring is to be provided on top of a prior flooring. The laminated board construction of the new parquet flooring must in this case not occupy too much height. It has been attempted to produce thin laminated parquet board constructions within the frame of prior art technique. Such constructions, however, are subject to the disadvantage that they will warp longitudinally and transversely due to moisture. One of the reasons for this is the difficulty to bring about correct interlocking due to the difference in fibre direction between the core and the wearing layer. One way to reduce warping in laminated boards of reduced thickness is to reduce the width of the laminated board. However, for economic reasons it is undesirable both from the point of view of manufacture and deposition to produce too narrow laminated boards. Accordingly the width of the thin laminated board should be at least the same as in conventional thicker types of laminated boards. Further, the width should be adapted to accepted module systems and suitably amounts to 2 M i.e. 200 mm.

In order to enable thin laminated boards to be manufactured and to avoid the above mentioned inconveniences the supporting core in itself should form an interlocking structure which is self-supporting during handling. So far, it has been very difficult to achieve this result. According to well-known conventional practice the core is produced from battens which are directed in dependence on the stave pattern of the wearing layer which means that if the core is to be made very thin the battens will be difficult to handle during manufacture.

Moreover, it is generally accepted practice to join laminated boards such as laminated parquet boards laterally by means of tongue and groove connections. When joining boards by tongue and groove the joint is normally glued whereby the glued laminated boards form a homogeneous flooring layer. The provision of tongue and groove joints in ordinary laminated boards does not involve any problem. Normally both the tongue and the groove are provided on the normal edge fillets of the core of the laminated board, i.e., immediately below the wearing layer. However, serious joining problems are encountered when thin laminated structures are to be joined. The problem is essentially due to the fact that the tongue and groove joint will not be sufficiently rigid and will fracture under load in particular if the substructure of the floor exhibits irregularities. In consideration of the fact that tongue and groove connections are the only practical way to join also thin laminated parquet boards it is imperative that these joints are given the greatest possible strength. This joining problem, however, cannot be solved in a satisfactory way by only using hard wood material for the edge fillet portions on which the groove and tongue joints are to be provided. In thin structures of this type additional strength problems are encountered which are related to joining.

If tongue and groove are to be provided in the end edges of the thin laminated parquet board problems are also encountered because generally no edge fillets are provided at the end edges. The supporting core which is to be provided with such a joint is generally produced from groups of battens arranged in panels with the grain direction alternatively going longitudinally and transversally of the board, said batten group being provided with edge fillets along the longer sides. The material from which the battens are made is generally not of higher wood quality. Consequently strength will be low if, for example, grooves are formed in the end portions of a board having longitudinally extending battens which means that under a concentrated load acting on an end edge joint the lower part of the groove wall in many cases will yeild. Thus, it is desirable to obtain a reinforcement of the groove wall portions exposed to stress i.e., primarily the lower wall portion which is exposed to stress due to load.

The present invention suggests a solution of the above mentioned problems, there being obtained according to the invention a component part for laminated boards exhibiting shape permanence and strength and adapted to be manufactured with very small thickness.

The characterizing features of the present invention will appear from the attached claims.

The invention will be described in greater detail by reference to the attached drawings illustrating an example of the manufacture of a component part, in the present case the supporting core of a laminated board to and including the manufacture of a final laminated parquet board.

Figure 1:
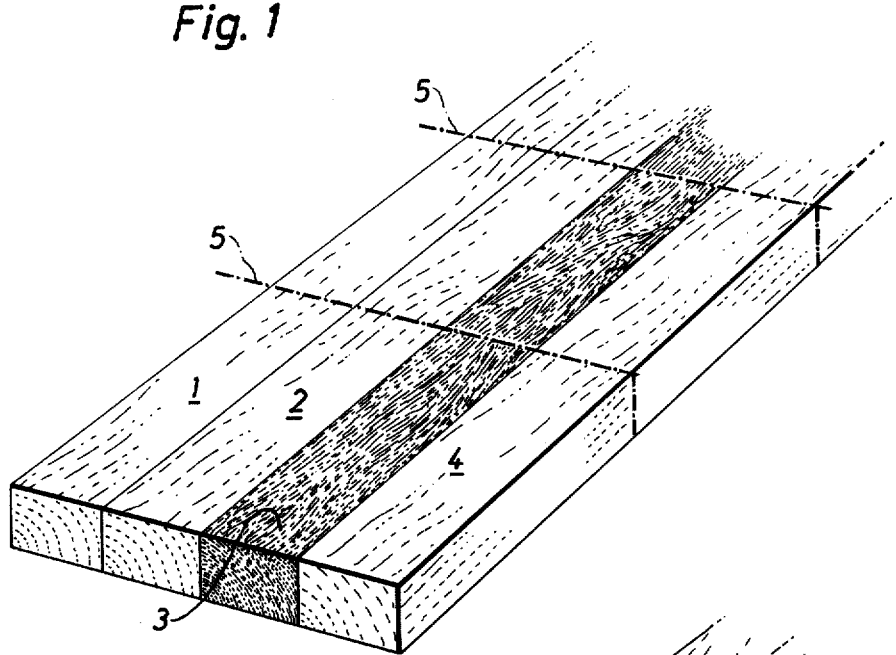
FIG. 1 is a perspective view of a starting blank composed of battens.

The starting blank shown in FIG. 1 is composed of four battens 1, 2, 3 and 4 which are laterally glued together. In actual practice the starting blank shown can be a continous web of battens in arbitrary lengths glued together laterally and endwise as supplied which is a conventional manufacturing method. Battens 1, 2 and 4 consist of a timber quality normal for this purpose. In contrast thereto batten 3 is made of hardwood. In the further handling of the starting blank described above the following steps are taken: The starting blank is, according to the present example severed into sections along transverse planes 5 indicated in FIG. 1, these planes being positioned so that every second section will be square and the intermediate sections will have shorter length depending on the parquet stave pattern of the wearing layer to be attached.

The sections obtained as described then are so disposed that every second section, in the present case each square section, has its battens extending transversely of the longitudinal direction of the laminated board to be made whereas the remaining sections have their battens extending in the same direction as the longitudinal direction of the laminated board to be manufactured. In this arrangement the sections are put together to the desired board length as appears from FIG. 2.

Figure 2:
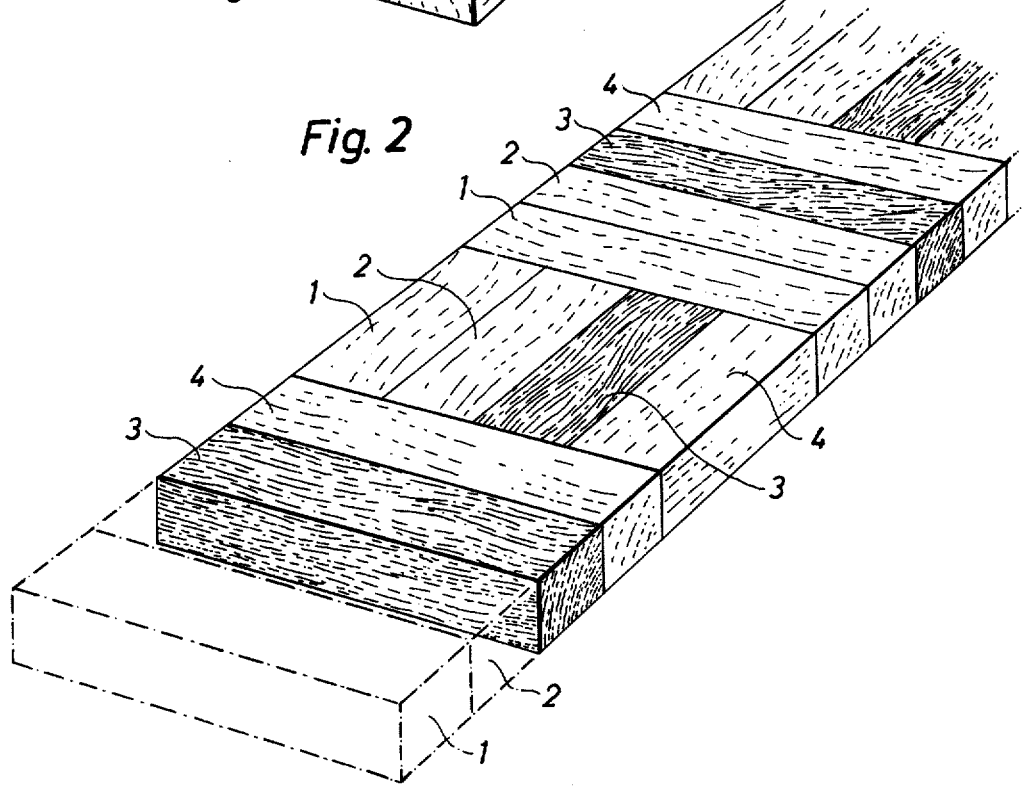
FIG. 2 to 5 are similar views which illustrate various manufacturing steps in the production of a supporting core.

The structure obtained according to FIG. 2 is cut in such a way that the outermost battens 1 and 2 indicated in broken lines are removed. Thus batten 3 consisting of hardwood will form the end batten. In practice cutting to required lengths is performed along such hardwood battens 3. Adjacent battens 1 and 2 will thus form the opposite end of a previously severed length. Thus, in practice, there will be no loss of two end battens 1, 2 as intimated in the example illustrated in FIG. 2.

Figure 3:
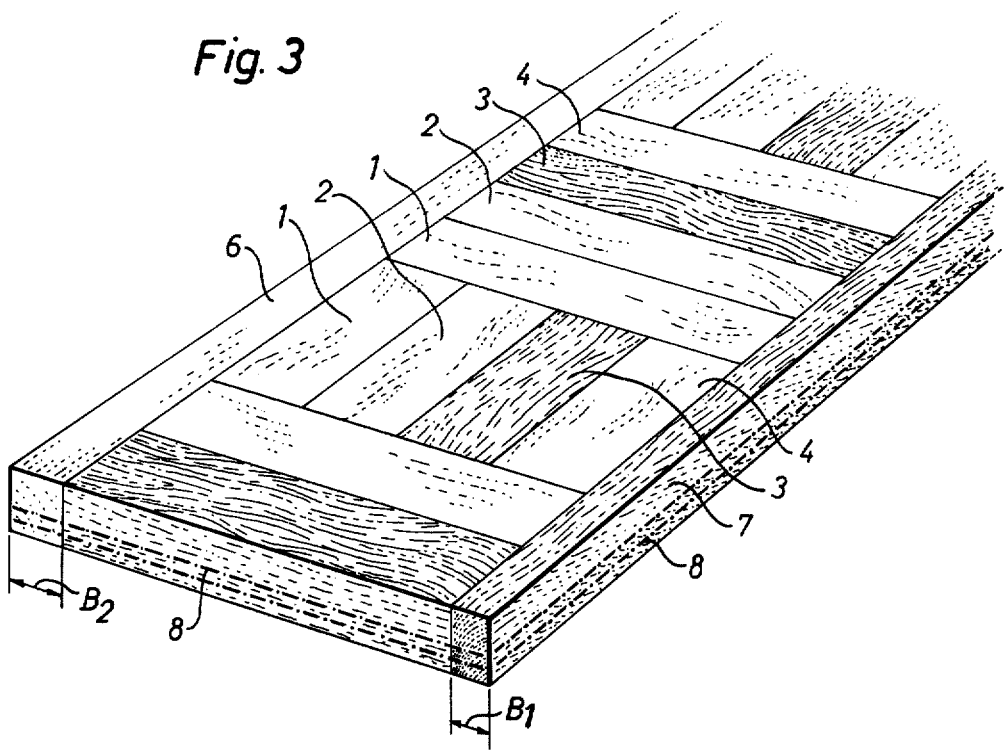
Figure 4:
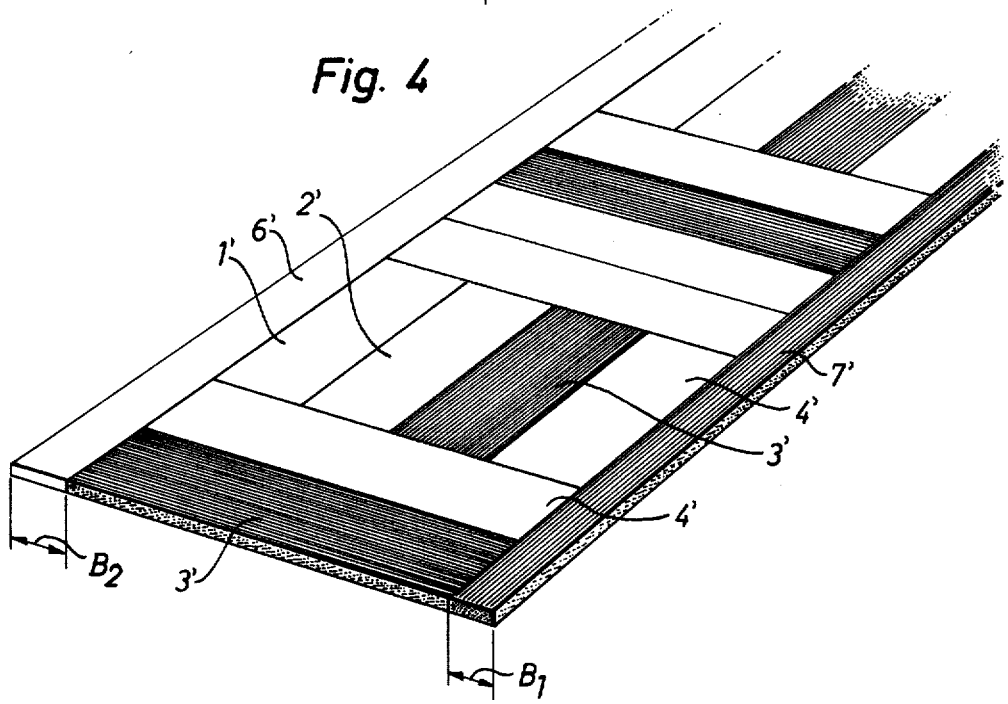

The structure obtained according to FIG. 2 is provided with longitudinal edge fillets 6, 7, as shown in FIG. 3. Edge fillet 7 in the present case is made of a relatively hard timber material as intimated by the hatching of the end surface whereas edge fillet 6 is made of a softer timber material as also intimated on the end surface of the last named edge fillet. As appears from the Figure, the hard-wood edge fillet 7 has a certain width designated as $B_1$ whereas the softer edge fillet 6 has a greater width designated as $B_2$ which in the present case is twice as large as $B_1$ counted in the transverse direction of the structure. As indicated by the cutting planes 8 the structure thus obtained is cleft in such a way that a plurality of very thin laminar core portions or laminae are obtained as shown in FIG. 4. These core portions have sufficient coherence between their component parts to be safely handled during continued working operations.

Figure 5:
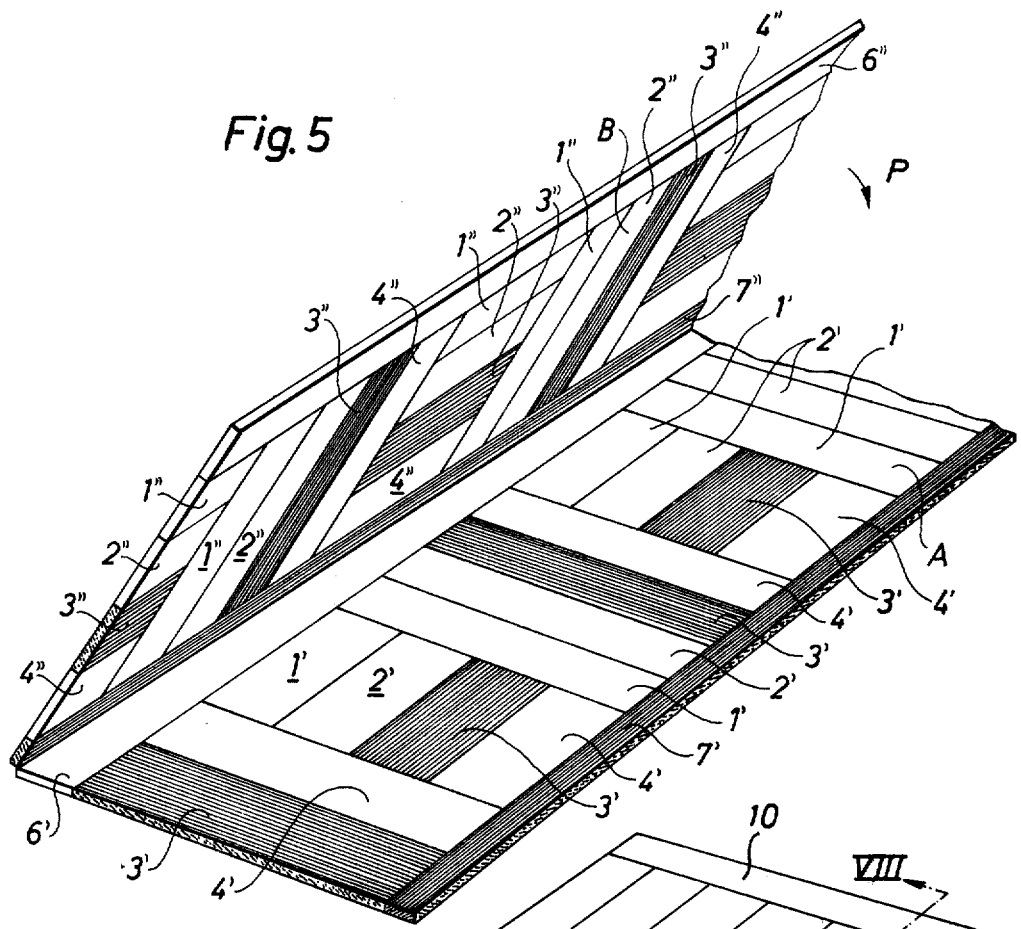

In FIG. 5 two core portions generally designated as A and B are shown in perspective view. To distinguish between the fillets and battens in both core portions A and B the reference designations are provided with respectively single or double quotation marks, the pattern of both core portions being identical. In order to prepare the final core the following steps are taken. As appears from FIG. 5 core portion B has been turned 180° and for the sake of clarity has been lifted so that the edge fillet portion 7'' of harder material abuts against the edge fillet portion 6' of softer material. As clearly appears from this Figure core portion B is longitudinally displaced one pattern step from core portion A in such a way that transverse batten portions in core portion B will essentially face longitudinally extending batten portions in core portion A and vice versa. For the sake of clarification the left hand end of core portion B has been cut in line with the end cut of the opposed core portion A. In this position of orientation core portion B is shown as being swung in the direction of arrow P to be joined with core portion A preferably by glueing. In actual practice core portion B is not turned into cooperation with core portion A, the joining being performed mechanically in rectilinear joining movements. Due to the fact that the battens in both core portions are mutually united with the fibre directions essentially oriented at right angles an efficient interlock is obtained in the structure whereby shape distorsion due, for example, to moisture, is effectively counteracted.

Figure 6:
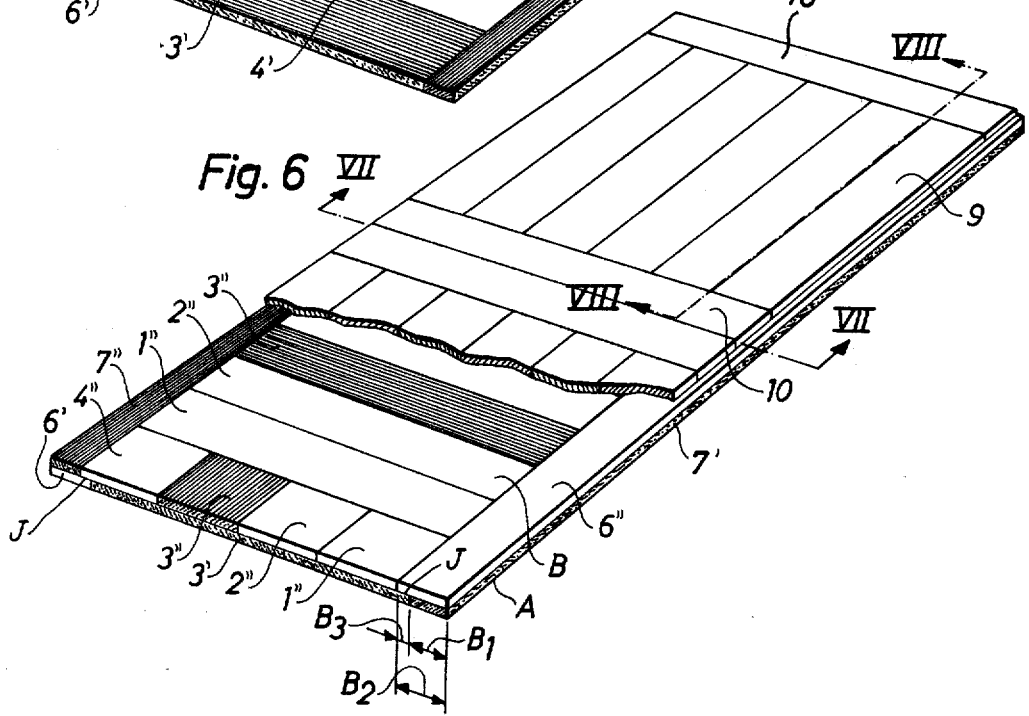
FIG. 6 illustrates another step in the manufacture in which the component part has been provided with a parquet wearing layer which is in part broken away for the purpose of illustration.

From FIG. 6 there appears the mutual cooperation between edge fillet portions 6' and 7'' and 6'' and 7' respectively. As appears from prior Figures edge fillet portion 7' has a width $B_1$ whereas edge fillet portion 6'' for example has a width of $B_2$. In the joints J illustrated in FIG. 6 it is obvious that edge fillet portion 6'' overlaps the joint between edge fillet portion 7' and adjacent battens 3', 4' ... by a distance $B_3$ which is the difference between $B_1$ and $B_2$. Accordingly the edge fillets will be joined to each other and to adjacent battens in a stepwise manner. This construction is particularly advantageous because thereby a stable connection is obtained between the edge fillets and battens in the supporting core constructed in this way. In a way which is particularly simple from the point of view of manufacture it has thus been made possible to achieve an efficient joint between battens and edge fillets to the extent necessary in the construction of thin laminated boards. Thus the procedure is based on the provision of two edge fillets of different widths in a structure according to FIG. 3, a subsequent cleavage into thin laminate in accordance with FIG. 4 of the structure according to FIG. 3, turning of one of the laminar core portions 180° about its longitudinal axis, shifting of one of the core portions one pattern step in the longitudinal direction and laminating in the position so obtained to form a self-supportingly manageable structure as shown in FIG. 6.

Due to the fact that the various panels in the two core portions A and B are of different size a practically necessary overlapping is obtained so that the junctions between the board will not to any essential degree be mutually aligned, whereby good strength properties are obtained. Admittedly the desirable interlock will not be complete in the said overlapping portions, however, this is of minor importance because these portions are of relatively short extension. Although this would be practically less suitable, it is of course possible to shape all the panels fully square thus to obtain complete interlock between the stave portions of the two core portions upon glueing.

Figure 7:
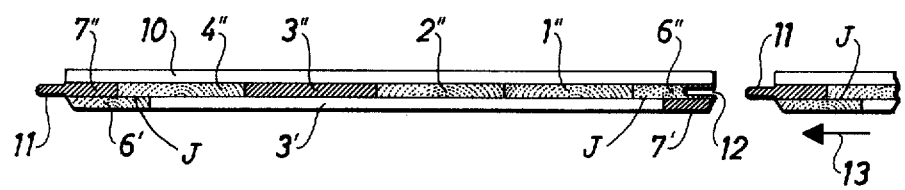
FIG. 7 is a section in an enlarged scale along line VII—VII in FIG. 6 is another similar view which of the final laminated parquet board provided with groove and tongue.

The supporting core obtained in accordance with FIG. 6 and comprising core portions A and B is suitably provided with a wearing parquet layer comprising longitudinally and transversely extending staves 9 and 10 respectively which are oriented in relation to the upper surface of core portion B so that also in this respect a substantial interlock will be obtained between the staves of the wearing layer and the battens of core portion B. In its state now obtained the laminated parquet board must be provided with longitudinal joining means in the form of tongues and grooves as appears from FIG. 7 which is a section along line VII—VII in FIG. 6 (it being noted that in FIG. 6 the edge fillets are not yet finished as in the case of FIG. 7). As previously mentioned, edge fillet portion 7'' consists of harder material which is glued together with the underlying edge fillet portion 6' of softer material, and edge fillet portion 6'' of softer material on the opposite longitudinal edge of the board is glued together with edge fillet portion 7' of harder material. It is a general rule that tongue and groove portions of a board are provided in a central portion of the edge surfaces of the board. So is also the case here, the profile obtained appearing from FIG. 7. In the edge portion shown to the left of the drawing a tongue 11 is formed in edge fillet portion 7'' by a milling or cutting process whereas in the edge portion shown to the right in the drawing a groove 12 is cut in edge fillet portion 6''. As appears from FIG. 7 tongue 11 due to this procedure will consist of hard material whereas groove 12 is formed in a softer material. Tongue 11 of an adjacent laminated board indicated in the right hand portion of FIG. 7, when shifted to the left towards groove 12 in the direction of arrow 13, will co-operate with its tongue of hard material with groove 12 formed in the softer material. A joint J formed thereby will exhibit particularly good strength under mechanical stress because portion 7' below groove 12 is made of hard material and thus will form an efficient support of tongue 11 and the related edge fillet portion. Obviously, hereby, there is obtained a particularly simple solution of the problem to obtain rigid and practical joints in particularly thin laminated boards. Thus the invention solves, on the one hand, the problem to bring about great strength in a tongue and groove joint between thin laminated boards and, on the other hand, the problem to obtain an optimum cooperation between hard and soft materials in a joint, there being obtained in addition a considerable saving in material because hard wood material is required only to a very small extent.

Figure 8:
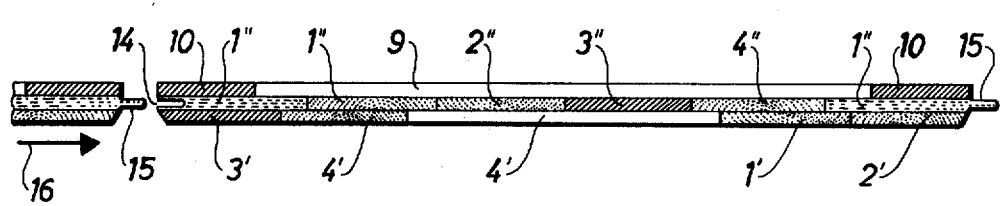
FIG. 8 is a section also in an enlarged scale along line VIII—VIII in FIG. 6 of a final laminated parquet board provided with groove and tongue at the end edges.

In order to enable laminated boards manufactured in the way as described above to be joined endwise the following procedure is adopted and it is referred to FIG. 8 which for the sake of clearness shows a length of the board only comprising one pattern step. In the end of the structure shown a groove is cut into core portion B, this groove being designated 14 in FIG. 8. This groove is formed in end grain due to the orientation of battens 1'' to 4'' in the longitudinal direction of the board. As additionally appears from FIG. 8 the opposite end edge of the board is provided with a tongue 15. In the same way as the groove the tongue is formed of material comprising the longitudinal batten portions 1'' to 4''. Hereby, there is directly obtained a desirable fibre direction of the tongue, i.e., in the direction of the extension of the tongue. As appears from FIG. 8 the groove will be effectively supported by hard wood, i.e., the transverse batten 3'. Thus, when a tongue 15 by a shifting movement in the direction of arrow 16 will be brought into cooperation with groove 14 there is almost no risk whatsoever of breakage of material sections adjacent the groove even if a heavy load is applied locally. In this connection it is to be noted that a portion of the tongue material consists of hard wood, viz. the portion formed at the respective batten 3''. This, of course, contributes essentially towards the strength of the final joint.

Thus, it appears that in a simple way a reinforcement has been brought about also of the end edge joint portions due to a manufacturing method, viz. the insertion of a hard wood batten during manufacture of the material web adapted to form the batten groups in a supporting core according to FIG. 1. Obviously, the procedure is particularly efficient. An advantage obtained by the invention resides in the fact that the component part constituted by the supporting core can be manufactured within a region where suitable sorts of timber are available, the structure subsequently being shipped to a place, for example in another country, for further treatment such as application of a wearing layer where suitable material for this purpose is available. By the specific construction a self-supportingly manageable core structure is obtained which has adequate strength for shipping.

Within the frame of the invention it is obviously not necessary to provide a hard wood batten on the position of hard wood batten 3 in the group of battens exactly as shown. Any other position may be chosen, provided that the cutting of the structure obtained according to FIG. 2 is adapted to the position of the hard wood batten in question. Although this is less advantageous, the procedure may also be such that each group of battens is formed separately, at least one group of battens comprising battens extending transversely in relation to the longitudinal direction of the board having one batten of harder material compared to the other battens, this batten forming the end fillet in the board to be manufactured. Moreover, it is not necessary that the disk or lamina designated as 1'' to 7'' is made from the same blank as 1' to 7'. Disk 1'' to 7'' can be manufactured separately without comprising hard wood battens which means that battens 3'' therein can be made from the same material as the rest of the battens.

In performing the invention in accordance with its basic idea it is of course not necessary that the edge fillet portions are made in the way as described above, it being possible that these portions are made in any other suitable construction although the structure and shape as described above is particularly suitable from the point of view of strength.

I claim:

1. A core for floor boarding comprising:
   at least two oblong panels, each consisting of wood boards and each having its boards disposed in first patterns, recurrent longitudinally of the oblong panel, of first, mutually parallel boards having a first direction relative to the oblong panel, and in second patterns, between the first patterns, of second, mutually parallel boards having a second direction relative to the oblong panel, the panels being laminated together and having boards of each first pattern of one panel interlocked transversely with boards of a second pattern of another panel laminated with said one panel, and vice versa, and
   at least two pairs of elongate edge fillets, each fillet extending longitudinally of one of the oblong panels and having a first edge secured to one side edge of the panel, such fillets of each pair thereof facing one another, being laminated together with one another and having substantially coincident, free, second edges to define fillet surfaces of different width, facing one another, whereby the core has, between its panels and edge fillets, substantially step-like joints reinforcing side edge portions of the core.

2. A core according to claim 1 in which one edge fillet of each pair consists of hard-wood and the other edge fillet of the pair consists of softer wood.

3. A core according to claim 2 in which the hardwood fillet of each pair is the fillet having a surface of greater width than the fillet facing it.

4. A core according to claim 1 in which all of said boards have similar dimensions, each first and second pattern comprising a hard-wood board among, and parallel with, a plurality of boards of softer wood.

5. A core according to claim 4 in which the boards of spaced-apart first patterns are arranged longitudinally of the respective panel.

6. A method of manufacturing a core for floor boarding, comprising the steps of arranging wood battens and securing them together to form an oblong web and to define recurrent patterns of parallel battens in said web, with the battens of a first group of patterns being disposed transversely of the battens of a second group of patterns;

securing a relatively wide elongate edge fillet batten to a first side edge of the oblong web, transversely of at least the battens of said other group; similarly securing a relatively narrow elongate edge fillet batten to a second side edge of the oblong web;

slicing the web, with the fillet battens secured thereto, to produce a plurality of slabs; and laminating such slabs together, with a relatively wide edge fillet slab portion facing a relatively narrow one, to produce a core with substantially step-like joints between panel laminae and edge fillet laminae.

7. A method according to claim 6 including the step of disposing the slabs, prior to laminating them, to interlock slab portions of the first group with slab portions of the second group of patterns.

8. A method of manufacturing a core according to claim 6, and of completing the core to produce a floor, including the steps of laminating the core with a wearing layer; cutting a side edge of the resulting floor to produce a tongue comprising part of one edge fillet slab portion and cutting another side edge of the floor to produce a groove in the other edge fillet slab portion.

9. A method according to claim 8 including the steps of providing a hard-wood batten disposed at and parallel to an end of the web; and cutting the floor to produce a tongue comprising part of said hard-wood batten.

10. A floor comprising, laminated together:

at least two oblong core panels each consisting of wood boards and each having its boards disposed in patterns recurrent longitudinally of the oblong core panel, with parallel boards having a first direction relative to the oblong core panel in first patterns spaced apart longitudinally of the oblong core panel and with parallel boards having a second direction relative to the oblong core panel in second patterns between the first patterns, boards of each first pattern of one core panel being interlocked transversely with boards of a second pattern of another core panel;

at least two pairs of elongate edge fillets, each fillet extending longitudinally of one of the oblong core panels and having a first edge secured to a side edge thereof, such fillets of each pair facing one another, being laminated together, having substantially coincident, free, second edges, and having surfaces of different width facing one another, and a wearing layer secured to one of the core panels and to the pair of edge fillets secured thereto.

11. A floor according to claim 10 in which at least one of said edge fillets consists of hard-wood, the floor having a tongue projecting from the hard-wood edge fillet and a groove recessed into an opposite edge fillet portion of the floor.

12. A floor according to claim 10 in which the parallel boards in each pattern include a hard-wood board among boards of softer wood.

13. A floor according to claim 10 in which the boards of one group of patterns in each oblong core panel extend parallel to an end of said oblong panel and include a hard-wood board at said end.

* * * * *